(12) United States Patent
Oh et al.

(10) Patent No.: US 7,676,548 B2
(45) Date of Patent: Mar. 9, 2010

(54) SYSTEM AND METHOD FOR PROVIDING A PRESENCE SERVICE

(75) Inventors: Jae-Kwon Oh, Seoul (KR); Wuk Kim, Gwacheon-si (KR); Sang-Kyung Sung, Seoul (KR)

(73) Assignee: Samsung Electronics Co., Ltd (KR)

( * ) Notice: Subject to any disclaimer, the term of this patent is extended or adjusted under 35 U.S.C. 154(b) by 481 days.

(21) Appl. No.: 11/635,137

(22) Filed: Dec. 7, 2006

(65) Prior Publication Data
US 2007/0168424 A1    Jul. 19, 2007

(30) Foreign Application Priority Data
Dec. 7, 2005 (KR) ............... 10-2005-0119017
Dec. 7, 2006 (KR) ............... 10-2006-0123458

(51) Int. Cl.
*G06F 15/16* (2006.01)

(52) U.S. Cl. .................. 709/208; 709/203; 709/217; 709/220; 709/223; 709/229

(58) Field of Classification Search ............ 709/203, 709/208, 217, 220, 223, 229
See application file for complete search history.

(56) References Cited

U.S. PATENT DOCUMENTS

| | | | |
|---|---|---|---|
| 6,853,634 B1 | 2/2005 | Davies et al. | |
| 6,990,513 B2 * | 1/2006 | Belfiore et al. | 709/203 |
| 7,263,551 B2 * | 8/2007 | Belfiore et al. | 709/219 |
| 2004/0083291 A1 * | 4/2004 | Pessi et al. | 709/227 |
| 2004/0128344 A1 * | 7/2004 | Trossen | 709/203 |
| 2005/0255811 A1 * | 11/2005 | Allen et al. | 455/78 |
| 2006/0121161 A1 * | 6/2006 | Garrett | 426/120 |
| 2006/0126601 A1 * | 6/2006 | Kim et al. | 370/352 |
| 2006/0179115 A1 * | 8/2006 | Garcia-Martin et al. | 709/217 |
| 2006/0239247 A1 * | 10/2006 | Postmus | 370/352 |

FOREIGN PATENT DOCUMENTS

EP    1 441 486    7/2004

OTHER PUBLICATIONS

Rajaniemi et al, "SIP and Presence," 2005, available online: http://fixxxer.cc/pub/gaim-sip/simplep.pdf.*
Campbell et al.; "Session Initiation Protocol (SIP) Extension for Instant Messaging"; Dec. 2002; pp. 17.

(Continued)

*Primary Examiner*—Dohm Chankong
(74) *Attorney, Agent, or Firm*—The Farrell Law Firm, LLP

(57) ABSTRACT

A system and method including registering state information capable of being published by an Event Publication Agent (EPA) using a Media Feature Tag according to Session Initiation Protocol (SIP); sending a Publication Rule for target state information from a Ruler to an associated EPA; routing the Publication Rule to the EPA; receiving, by the EPA, the Publication Rule; performing publication to an Event State Composer (ESC) according to the Publication Rule; requesting to update or cancel the Publication Rule; receiving the request from the Ruler and modifying the Publication Rule accordingly; performing publication from the EPA to the ESC according to the modified Publication Rule; sending a Publication Rule synchronization request from the Ruler to the EPA using an event package; sending a response message to the Publication Rule synchronization request from the EPA; and sending notification of further updates of the Publication Rule from the EPA.

2 Claims, 27 Drawing Sheets

OTHER PUBLICATIONS

J. Rosenberg; A Presence Event Package for the Session Initiation Protocol (SIP); Aug. 2004; pp. 26.

K. Holtman et al.; "Media Feature Tag Registration Procedure"; Mar. 1999; pp. 12.

J. Rosenberg et al.; "Indicating User Agent Capabilities in the Session Initiation Protocol (SIP)"; Aug. 2004; pp. 34.

A.B. Roach; "Session Initiation Protocol (SIP)—Specific Event Notification"; Jun. 2002 pp. 36.

J. Rosenberg; "Obtaining and Using Globally Routable User Agent (UA) URIs (GRUU) in the Session Initiation Protocol (SIP)"; Oct. 2005; pp. 41.

H. Khartabil et al.; "Functional Description of Event Notification Filtering"; Mar. 2005; pp. 31.

H. Schulzrine et al.; "RPID: Rich Presence Extensions to the Presence Information Data Format"; Sep. 2005; pp. 39.

A. Niemi; "Session Initiation Protocol (SIP) Extension for Event State Publication"; Oct. 2004; pp. 30.

H. Schulzrinne et al.; "A Document Format for Expressing Privacy Preferences"; Oct. 2005; pp. 42.

J. Rosenberg; "A Data Model for Presence" Oct. 2005; pp. 32.

J. Rosenberg et al.; "SIP: Session Initiation Protocol"; Jun. 2002; pp. 252.

Bergmann et al., "A Script-Based Approach to Distributed Presence Aggregation", 2005.

Jiang et al., "Two Approaches for Advanced Presence Services in SIP Communications", 2005.

\* cited by examiner (a) SUBSCRIBE sip:presentity@example.com SIP/2.0
    Via: SIP/2.0/TCP host.example.com; branch=z9G4bKnashds7
    To: <sip:presentity@example.com>
    From: <sip:watcher@example.com>;tag=12341234
    Call-ID: 12345678@host.example.com
    CSeq: 1 SUBSCRIBE
    Max-Forwards: 70
    Expires: 3600
    Event: presence
    Contact: <sip:user@host.exmaple.com>
    Content-Length: 0

(b) SIP/2.0 200 OK
    Via: SIP/2.0/TCP host.example.com; branch=z9G4bKnashds7; received=192.0.2.1
    To: <sip:presentity@example.com>;tag=abcd1234
    From: <sip:watcher@example.com>;tag=12341234
    Call-ID: 12345678@host.example.com
    CSeq: 1 SUBSCRIBE
    Expires: 3600
    Content-Length: 0

(c) NOTIFY sip:user@host.example.com SIP/2.0
    Via: SIP/2.0/TCP pa.example.com; branch=z9hG4bK8sdf2
    To: <sip:watcher@example.com>;tag=12341234
    From: <sip:presentity@example.com>;tag=abcd1234
    Call-ID: 12345678@host.example.com
    CSeq: 1 NOTIFY
    Max-Forwards: 70
    Event: presence
    Subscription-State: active; expires=3599
    Contact: sip:pa.example.com
    Content-Type: application/pidf+xml
    Content-Length: ...
    [PIDF document]

(d) SIP/2.0 200 OK
    Via: SIP/2.0/TCP pa.example.com; branch=z9hG4bK8sdf2; received=192.0.2.2
    To: <sip:watcher@example.com>;tag=12341234
    From: <sip:presentity@example.com>;tag=abcd1234
    Call-ID: 2010@watcherhost.example.com
    Call-ID: 12345678@host.example.com
    CSeq: 1 NOTIFY

FIG.3A
(PRIOR ART)

(e) PUBLISH sip:presentity@example.com SIP/2.0
    Via: SIP/2.0/UDP pua.example.com; branch=z9hG4bK652hsge
    To: <sip:presentity@example.com>
    From: <sip:presentity@example.com>;tag=1234wxyz
    Call-ID: 81818181@pua.example.com
    CSeq: 1 PUBLISH
    Max-Forwards: 70
    Expires: 3600
    Event: presence
    Content-Type: application/pidf+xml
    Content-Length: ...
    [Published PIDF document]

(f) SIP/2.0 200 OK
    Via: SIP/2.0/UDP pua.example.com;branch=z9hG4bK652hsge; received=192.0.2.3
    To: <sip:presentity@example.com>;tag=1a2b3c4d
    From: <sip:presentity@example.com>;tag=1234wxyz
    Call-ID: 81818181@pua.example.com
    CSeq: 1 PUBLISH
    SIP-ETag: dx200xyz
    Expires: 1800

(g) NOTIFY sip:user@host.example.com SIP/2.0
    Via: SIP/2.0/UDP pa.example.com;branch=z9hG4bK4cd42a
    To: <sip:watcher@example.com>;tag=12341234
    From: <sip:presentity@example.com>;tag=abcd1234
    Call-ID: 12345678@host.example.com
    CSeq: 2 NOTIFY
    Max-Forwards: 70
    Event: presence
    Subscription-State: active; expires=3400
    Contact: sip:pa.example.com
    Content-Type: application/pidf+xml
    Content-Length: ...
    [New PIDF document]

(h) SIP/2.0 200 OK
    Via: SIP/2.0/UDP pa.example.com; branch=z9hG4bK4cd42a; received=192.0.2.2
    To: <sip:watcher@example.com>;tag=12341234
    From: <sip:presentity@example.com>;tag=abcd1234
    Call-ID: 12345678@host.example.com
    CSeq: 2 NOTIFY
    Content-Length: 0

FIG.3B
(PRIOR ART)

(i) PUBLISH sip:presentity@example.com SIP/2.0
Via: SIP/2.0/UDP pua.example.com; branch=z9hG4bK771ash02
To: <sip:presentity@example.com>
From: <sip:presentity@example.com>;tag=1234kljk
Call-ID: 98798798@pua.example.com
CSeq: 1 PUBLISH
Max-Forwards: 70
SIP-If-Match: dx200xyz
Expires: 3600
Event: presence
Content-Length: 0

(j) SIP/2.0 200 OK
Via: SIP/2.0/UDP pua.example.com; branch=z9hG4bK771ash02; received=192.0.2.3
To: <sip:presentity@example.com>;tag=2affde434
From: <sip:presentity@example.com>;tag=1234kljk
Call-ID: 98798798@pua.example.com
CSeq: 1 PUBLISH
SIP-ETag: kwj449x
Expires: 1800

(k) PUBLISH sip:presentity@example.com SIP/2.0
Via: SIP/2.0/UDP pua.example.com; branch=z9hG4bKcdad2
To: <sip:presentity@example.com>
From: <sip:presentity@example.com>;tag=54321mm
Call-ID: 5566778@pua.example.com
CSeq: 1 PUBLISH
Max-Forwards: 70
SIP-If-Match: kwj449x
Expires: 3600
Event: presence
Content-Type: application/pidf+xml
Content-Length: ...
[Published PIDF Document]

(l) SIP/2.0 200 OK
Via: SIP/2.0/UDP pua.example.com; branch=z9hG4bKcdad2; received=192.0.2.3
To: <sip:presentity@example.com>;tag=effe22aa
From: <sip:presentity@example.com>;tag=54321mm
Call-ID: 5566778@pua.example.com
CSeq: 1 PUBLISH
SIP-ETag: qwi982ks
Expires: 3600

FIG.3C
(PRIOR ART)

(m) NOTIFY sip:user@host.example.com SIP/2.0
   Via: SIP/2.0/UDP pa.example.com; branch=z9hG4bK32defd3
   To: <sip:watcher@example.com>;tag=12341234
   From: <sip:presentity@example.com>;tag=abcd1234
   Call-ID: 12345678@host.example.com
   CSeq: 2 NOTIFY
   Max-Forwards: 70
   Event: presence
   Subscription-State: active; expires=3400
   Contact: sip:pa.example.com
   Content-Type: application/pidf+xml
   Content-Length: ...
   [New PIDF document]

(n) SIP/2.0 200 OK
   Via: SIP/2.0/UDP pa.example.com; branch=z9hG4bK32defd3; received=192.0.2.3
   To: <sip:watcher@example.com>;tag=12341234
   From: <sip:presentity@example.com>;tag=abcd1234
   Call-ID: 12345678@host.example.com
   CSeq: 2 NOTIFY
   Content-Length: 0

FIG.3D
(PRIOR ART)

```xml
<?xml version="1.0" encoding="UTF-8"?>
<pr:publish_rule xmlns="urn:ietf:params:xml:ns:common-policy"
                 xmlns:pr="urn:oma:params:xml:ns:publish-rules">
<pr:Header>
   <pr:requetor>sip:esc.example.com</pr:requestor>
   <pr:time>2005-08-12T14:07:10+09:00</pr:time>
   <pr:target>
      <pr:target_contact/>
      <pr:target_state>+g.publish.location</pr:target_state>
      <pr:target_entity>sip:brian@example.com</pr:target_entity>
   </pr:target>
</pr:Header>
<ruleset>
   <rule id="e83jhf">
      <conditions>
         <pr:target_state>+g.publish.location</pr:target_state>
         <pr:target_entity>sip:brian@example.com</pr:target_entity>
         <pr:valid_time>
            <pr:from>2005-08-14T09:00:00+09:00</pr:from>
            <pr:until>2005-09-14T23:00:00+09:00</pr:until>
            <pr:duration/>
         </pr:valid_time>
      </conditions>
      <actions>
         <pr:trigger>
            <pr:interval>1800</pr:interval>
         </pr:trigger>
      </actions>
      <transformations>
         <pr:max_accuracy>100</pr:max_accuracy>
      </transformations>
   </rule>
</ruleset>
</pr:publish_rule>
```

FIG.6

```xml
<?xml version="1.0" encoding="UTF-8"?>
<pr:publish_rule xmlns="urn:ietf:params:xml:ns:common-policy"
                 xmlns:pr="urn:oma:params:xml:ns:publish-rules">
<pr:Header>
    <pr:requetor>sip:esc.example.com</pr:requestor>
    <pr:time>2005-09-02T09:00:00+09:00</pr:time>
    <pr:target>
      <pr:target_contact/>
      <pr:target_state>+g.publish.ua-prof</pr:target_state>
      <pr:target_entity>sip:brian@example.com</pr:target_entity>
    </pr:target>
</pr:Header>
<ruleset>
    <rule id="e8mjjs">
      <conditions>
        <pr:target_state>+g.publish.ua-profile</pr:target_state>
        <pr:target_entity>sip:brian@example.com</pr:target_entity>
        <pr:valid_time>
          <pr:duration>0</pr:duration>
        </pr:valid_time>
      </conditions>
      <actions/>
      <transformations/>
    </rule>
</ruleset>
</pr:publish_rule>
```

FIG.7

```xml
<?xml version="1.0" encoding="UTF-8"?>
<pr:publish_rule xmlns="urn:ietf:params:xml:ns:common-policy"
                 xmlns:pr="urn:oma:params:xml:ns:publish-rules">
<pr:Header>
   <pr:requestor>sip:esc.example.com</pr:requestor>
   <pr:time>2005-08-14T09:00:00+09:00</pr:time>
   <pr:target>
      <pr:target_contact/>
      <pr:target_state>+g.publish.game</pr:target_state>
      <pr:target_entity>sip:brian@example.com</pr:target_entity>
   </pr:target>
</pr:Header>
<ruleset>
   <rule id="45iesd">
      <conditions>
         <pr:target_state>+g.publish.game</pr:target_state>
         <pr:target_entity>sip:brian@example.com</pr:target_entity>
         <pr:valid_time/>
      </conditions>
      <actions>
         <pr:cancel/>
      </actions>
      <transformations/>
   </rule>
</ruleset>
</pr:publish_rule>
```

FIG.8

(a) REGISTER sip:registrar.example.com SIP/2.0
   Via: SIP/2.0/TCP ua1.example.com;branch=z9G4bKnashds7
   From: Brian <sip:brian@example.com>;tag=xfg9
   To: Brian <sip:brian@example.com>
   Call-ID: 1384@ua1.example.com;+g.oma.publish.ua-prof
   CSeq: 1 REGISTER
   Contact: <sip:brian@ua1.example.com>
   Expires: 7200
   Content-Length: 0

(b) SIP/2.0 200 OK
   Via: SIP/2.0/TCP ua1.example.com;branch=z9G4bKnashds7;received=192.0.2.4
   From: Brian <sip:brian@example.com>;tag=xfg9
   To: Brian <sip:brian@example.com>;tag=e8xjh
   Call-ID: 1384@ua1.example.com
   CSeq: 1 REGISTER
   Expires: 7200
   Content-Length: 0

FIG.10

(a) Ruler 1
   SIP AOR: <sip:brian@example.com>
   SIP URI: <sip:brian@ua1.example.com>
   IP address: 192.0.1.1

(b) Ruler 2
   SIP AOR: <sip:admin@example.com>
   SIP URI: <sip:admin@ua2.example.com>
   IP address: 192.0.1.2

(c) ESC
   SIP AOR: <sip:brian@example.com>
   SIP URI: <sip:brian@esc.example.com>
   IP adress: 192.0.1.3

(d) EPA
   SIP AOR: <sip:brian@example.com>
   SIP URI: <sip:brian@epa2.example.com>
   IP adress: 192.0.1.4
   Registered Media Feature Tag: +g.publish.game

FIG.12

(a) SUBSCRIBE sip:brian@example.com SIP/2.0
    Via: SIP/2.0/TCP ua1.example.com;branch=z9hG4bK1111
    From: <sip:brian@example.com>;tag=1234
    To: <sip:brian@example.com>
    Call-ID: 1111@ua1.example.com
    CSeq: 1 SUBSCRIBE
    Max-Forwards: 70
    Event: publish;target_state="location";target_entityt="brian@example.com"
    Accept: application/pub_rule+xml
    Contact: <sip:brian@ua1.example.com>
    Expires: 43200
    Content-Length: 0

(b) SIP/2.0 200 OK
    Via: SIP/2.0/TCP ua1.example.com;branch=z9hG4bK1111;received=192.0.2.1
    From: <sip:brian@example.com>;tag=1234
    To: <sip:brian@example.com>; tag=abcd
    Call-ID: 1111@ua1.example.com
    CSeq: 1 SUBSCRIBE
    Expires: 43200
    Content-Length: 0

(c) NOTIFY sip:brian@ua1.example.com SIP/2.0
    Via: SIP/2.0/TCP epa2.example.com; branch=z9hG4bK2222
    From: <sip:brian@example.com>; tag=abcd
    To: <sip:brian@example.com>; tag=1234
    Call-ID: 1111@ua1.example.com
    CSeq: 2 NOTIFY
    Event: publish
    Subscription-State: active; expires=43195
    Max-Forwards: 70
    Contact: <sip:brian@epa2.example.com>
    Content-Type: application/pub_rule+xml
    Content-Length: ···.
    <?xml version="1.0" encoding="UTF-8"?>
    <pr:publish_rule xmlns="urn:ietf:params:xml:ns:common-policy"
              xmlns:pr="urn:oma:params:xml:ns:publish-rules">
    </pr:publish_rule>

FIG.13A (d) SIP/2.0 200 OK
    Via: SIP/2.0/TCP epa2.example.com; branch=z9hG4bK2222; received=192.0.1.4
    From: <sip:brian@example.com>; tag=abcd
    To: <sip:brian@example.com>; tag=1234
    Call-ID: 1111@ua1.example.com
    CSeq: 2 NOTIFY
    Content-Length: 0

(e) MESSAGE sip:brian@example.com SIP/2.0
    Via: SIP/2.0/TCP ua1.example.com;branch=z9hG4bK3333
    From: <sip:brian@example.com>;tag=12345
    To: <sip:brian@example.com>
    Call-ID: 3333@ua1.example.com
    CSeq: 3 MESSAGE
    Max-Forwards: 70
    Content-Type: application/pub_rule+xml
    Content-Length: ....
    <?xml version="1.0" encoding="UTF-8"?>
    <pr:publish_rule xmlns="urn:ietf:params:xml:ns:common-policy"
                    xmlns:pr="urn:oma:params:xml:ns:publish-rules">
    <pr:Header>
       <pr:requetor>sip:brian@example.com</pr:requestor>
       <pr:time>2005-04-24T06:06:00+09:00</pr:time>
       <pr:target>
         <pr:target_contact/>
         <pr:target_state>+g.publish.game</pr:target_state>
         <pr:target_entity>sip:brian@example.com</pr:target_entity>
       </pr:target>
    </pr:Header>
    <ruleset>
       <rule id="e83jhf">
         <conditions>
            <pr:target_state>+g.publish.game</pr:target_state>
            <pr:target_entity>sip:brian@example.com</pr:target_entity>
            <pr:valid_time>
               <pr:from>2005-04-24T09:00:00+09:00</pr:from>
               <pr:until>2005-04-30T23:00:00+09:00</pr:until>
            </pr:valid_time>
         </conditions>
         <actions>
            <pr:trigger>
               <pr:interval>100</pr:interval>
            </pr:trigger>
         </actions>
    </pr:publish_rule>

FIG.13B (f) SIP/2.0 200 OK
Via: SIP/2.0/TCP ua1.example.com;branch=z9hG4bK3333; received=192.0.1.1
From: <sip:brian@example.com>;tag=12345
To: <sip:brian@example.com>; tag=abcde
Call-ID: 3333@ua1.example.com
CSeq: 3 MESSAGE
Content-Length: 0

(g) NOTIFY sip:brian@ua1.example.com SIP/2.0
Via: SIP/2.0/TCP epa2.example.com; branch=z9hG4bK4444
From: <sip:brian@example.com>; tag=abcd
To: <sip:brian@example.com>; tag=1234
Call-ID: 1111@ua1.example.com
CSeq: 4 NOTIFY
Event: publish
Subscription-State: active; expires=42000
Max-Forwards: 70
Contact: <sip:brian@epa2.example.com>
Content-Type: application/pub_rule+xml
Content-Length: ....
<?xml version="1.0" encoding="UTF-8"?>
<pr:publish_rule xmlns="urn:ietf:params:xml:ns:common-policy"
        xmlns:pr="urn:oma:params:xml:ns:publish-rules">
<ruleset>
  <rule id="e83jhf">
    <conditions>
      <pr:target_state>+g.publish.game</pr:target_state>
      <pr:target_entity>sip:brian@example.com</pr:target_entity>
      <pr:valid_time>
        <pr:from>2005-04-24T09:00:00+09:00</pr:from>
        <pr:until>2005-04-30T23:00:00+09:00</pr:until>
      </pr:valid_time>
    </conditions>
    <actions>
      <pr:trigger>
        <pr:interval>100</pr:interval>
      </pr:trigger>
    </actions>
</pr:publish_rule>

FIG.13C (h) SIP/2.0 200 OK
    Via: SIP/2.0/TCP epa2.example.com; branch=z9hG4bK4444; received=192.0.1.4
    From: <sip:brian@example.com>; tag=abcd
    To: <sip:brian@example.com>; tag=1234
    Call-ID: 1111@ua1.example.com
    CSeq: 4 NOTIFY
    Content-Length: 0

(i) PUBLISH sip:brian@example.com SIP/2.0
    Via: SIP/2.0/TCP epa2.example.com; branch=z9hG4bK5555
    From: <sip:brian@example.com>;tag=123456
    To: <sip:brian@example.com>
    Call-ID: 5555@epa2.example.com
    CSeq: 5 PUBLISH
    Max-Forwards: 70
    Expires: 3600
    Event: presence
    Content-Type: application/pidf+xml
    Content-Length: ...
    [PIDF document on the game state of <sip:brian@example.com>]

(j) SIP/2.0 200 OK
    Via: SIP/2.0/TCP epa2.example.com; branch=z9hG4bK5555; received=192.0.1.4
    From: <sip:brian@example.com>;tag=123456
    To: <sip:brian@example.com>; tag=abcdef
    Call-ID: 5555@epa2.example.com
    CSeq: 5 PUBLISH
    SIP-ETag: dx200xyz
    Expires: 1800
    Content-Length: 0

FIG.13D (k) MESSAGE sip:brian@example.com SIP/2.0
Via: SIP/2.0/TCP ua1.example.com;branch=z9G4bK6666
From: <sip:brian@example.com>;tag=1234567
To: <sip:brian@example.com>
Call-ID: 6666@ua1.example.com
CSeq: 6 MESSAGE
Max-Forwards: 70
Content-Type: application/pub_rule+xml
Content-Length: ....
<?xml version="1.0" encoding="UTF-8"?>
<pr:publish_rule xmlns="urn:ietf:params:xml:ns:common-policy"
              xmlns:pr="urn:oma:params:xml:ns:publish-rules">
<pr:Header>
  <pr:requestor>sip:brian@example.com</pr:requestor>
  <pr:time>2005-04-24T20:00:00+09:00</pr:time>
  <pr:target>
    <pr:target_contact/>
    <pr:target_state>+g.publish.game</pr:target_state>
    <pr:target_entity>sip:brian@example.com</pr:target_entity>
  </pr:target>
</pr:Header>
<ruleset>
  <rule id="382kfld">
    <conditions>
      <pr:target_state>+g.publish.game</pr:target_state>
      <pr:target_entity>sip:brian@example.com</pr:target_entity>
      <pr:valid_time>
        <pr:from/>
        <pr:until/>
        <pr:duration>0</pr:duration>
      </pr:valid_time>
    </conditions>
    <actions/>
    <transformations/>
</pr:publish_rule>

(l) SIP/2.0 200 OK
Via: SIP/2.0/TCP ua1.example.com;branch=z9G4bK6666; received=192.0.1.1
From: <sip:brian@example.com>;tag=1234567
To: <sip:brian@example.com>; tag=abcdefg
Call-ID: 6666@ua1.example.com
CSeq: 6 MESSAGE
Content-Length: 0

FIG. 13E (m) PUBLISH sip:brian@example.com SIP/2.0
Via: SIP/2.0/TCP epa2.example.com; branch=z9hG4bK7777
From: <sip:brian@example.com>;tag=1212
To: <sip:brian@example.com>
Call-ID: 7777@epa2.example.com
CSeq: 7 PUBLISH
Max-Forwards: 70
SIP-If-Match: dx200xyz
Expires: 3600
Event: presence
Content-Type: application/pidf+xml
Content-Length: ...
[PIDF document on the game state of <sip:brian@example.com>]

(n) SIP/2.0 200 OK
Via: SIP/2.0/TCP epa2.example.com; branch=z9hG4bK7777; received=192.0.1.4
From: <sip:brian@example.com>;tag=1212
To: <sip:brian@example.com>; tag=abab
Call-ID: 7777@epa2.example.com
CSeq: 7 PUBLISH
SIP-ETag: asdf1234
Expires: 1800
Content-Length: 0

(o) PUBLISH sip:brian@example.com SIP/2.0
Via: SIP/2.0/TCP epa2.example.com; branch=z9hG4bK8888
From: <sip:brian@example.com>;tag=3434
To: <sip:brian@example.com>
Call-ID: 8888@epa2.example.com
CSeq: 8 PUBLISH
Max-Forwards: 70
SIP-If-Match: asdf1234
Expires: 3600
Event: presence
Content-Type: application/pidf+xml
Content-Length: ...
[PIDF document on the game state of <sip:brian@example.com>]

(p) SIP/2.0 200 OK
Via: SIP/2.0/TCP epa2.example.com; branch=z9hG4bK8888; received=192.0.1.4
From: <sip:brian@example.com>;tag=3434
To: <sip:brian@example.com>; tag=cdcd
Call-ID: 8888@epa2.example.com
CSeq: 8 PUBLISH
SIP-ETag: qwer5678
Expires: 1800
Content-Length: 0

FIG.13F (q) MESSAGE sip:brian@example.com SIP/2.0
Via: SIP/2.0/TCP ua2.example.com;branch=z9G4bK9999
From: <sip:brian@example.com>;tag=5656
To: <sip:brian@example.com>
Call-ID: 9999@ua2.example.com
CSeq: 9 MESSAGE
Max-Forwards: 70
Content-Type: application/pub_rule+xml
Content-Length: ....
<?xml version="1.0" encoding="UTF-8"?>
<pr:publish_rule xmlns="urn:ietf:params:xml:ns:common-policy"
          xmlns:pr="urn:oma:params:xml:ns:publish-rules">
<pr:Header>
   <pr:requetor>sip:admin@example.com</pr:requestor>
   <pr:time>2005-04-25T09:00:00+09:00</pr:time>
   <pr:target>
     <pr:target_contact/>
     <pr:target_state>+g.publish.game</pr:target_state>
     <pr:target_entity>sip:brian@example.com</pr:target_entity>
   </pr:target>
</pr:Header>
<ruleset>
   <rule id="asdf33">
     <conditions>
        <pr:target_state>+g.publish.game</pr:target_state>
        <pr:target_entity>sip:brian@example.com</pr:target_entity>
        <pr:valid_time>
          <pr:from/>
          <pr:until/>
        </pr:valid_time>
     </conditions>
   <actions>
     <pr:trigger>
        <pr:interval>500</pr:interval>
     </pr:trigger>
   </actions>
</pr:publish_rule>

(r) SIP/2.0 200 OK
Via: SIP/2.0/TCP ua2.example.com;branch=z9G4bK9999; received=192.0.1.2
From: <sip:brian@example.com>;tag=5656
To: <sip:brian@example.com>; tag=efef
Call-ID: 9999@ua2.example.com
CSeq: 9 MESSAGE
Content-Length: 0

FIG.13G (s) NOTIFY sip:brian@ua1.example.com SIP/2.0
Via: SIP/2.0/TCP epa2.example.com; branch=z9hG4bKaaaa
From: <sip:brian@example.com>; tag=abcd
To: <sip:brian@example.com>; tag=1234
Call-ID: 1111@ua1.example.com
CSeq: 10 NOTIFY
Event: publish
Subscription-State: active; expires=28000
Max-Forwards: 70
Contact: <sip:brian@epa2.example.com>
Content-Type: application/pub_rule+xml
Content-Length: ....
<?xml version="1.0" encoding="UTF-8"?>
<pr:publish_rule xmlns="urn:ietf:params:xml:ns:common-policy"
    xmlns:pr="urn:oma:params:xml:ns:publish-rules">
<ruleset>
<rule id="asdf33">
    <conditions>
        <pr:target_state>+g.publish.game</pr:target_state>
        <pr:target_entity>sip:brian@example.com</pr:target_entity>
        <pr:valid_time>
            <pr:from/>
            <pr:until/>
        </pr:valid_time>
    </conditions>
<actions>
    <pr:trigger>
        <pr:interval>500</pr:interval>
    </pr:trigger>
</actions>
</ruleset>
</pr:publish_rule>

(t) SIP/2.0 200 OK
Via: SIP/2.0/TCP epa2.example.com; branch=z9hG4bKaaaa; received=192.0.1.4
From: <sip:brian@example.com>; tag=abcd
To: <sip:brian@example.com>; tag=1234
Call-ID: 1111@ua1.example.com
CSeq: 10 NOTIFY
Content-Length: 0

FIG.13H (u) PUBLISH sip:brian@example.com SIP/2.0
Via: SIP/2.0/TCP epa2.example.com; branch=z9hG4bKbbbb
From: <sip:brian@example.com>;tag=7878
To: <sip:brian@example.com>
Call-ID: 1011@epa2.example.com
CSeq: 11 PUBLISH
Max-Forwards: 70
SIP-If-Match: qwer5678
Expires: 3600
Event: presence
Content-Type: application/pidf+xml
Content-Length: ...
[PIDF document on the game state of <sip:brian@example.com>]

(v) SIP/2.0 200 OK
Via: SIP/2.0/TCP epa2.example.com; branch=z9hG4bKbbbb; received=192.0.1.4
From: <sip:brian@example.com>;tag=7878
To: <sip:brian@example.com>; tag=ghgh
Call-ID: 1011@epa2.example.com
CSeq: 11 PUBLISH
SIP-ETag: asdf6789
Expires: 1800
Content-Length: 0

FIG.13I (w) MESSAGE sip:brian@example.com SIP/2.0
Via: SIP/2.0/TCP ua1.example.com;branch=z9G4bKcccc
From: <sip:brian@example.com>;tag=9090
To: <sip:brian@example.com>
Call-ID: 2020@ua1.example.com
CSeq: 12 MESSAGE
Max-Forwards: 70
Content-Type: application/pub_rule+xml
Content-Length: ....
<?xml version="1.0" encoding="UTF-8"?>
<pr:publish_rule xmlns="urn:ietf:params:xml:ns:common-policy"
          xmlns:pr="urn:oma:params:xml:ns:publish-rules">
<pr:Header>
   <pr:requetor>sip:brian@example.com</pr:requestor>
   <pr:time>2005-04-26T13:00:00+09:00</pr:time>
   <pr:target>
     <pr:target_contact/>
     <pr:target_state>+g.publish.game</pr:target_state>
     <pr:target_entity>sip:brian@example.com</pr:target_entity>
   </pr:target>
</pr:Header>
<ruleset>
   <rule id="1jeufh">
     <conditions>
       <pr:target_state>+g.publish.game</pr:target_state>
       <pr:target_entity>sip:brian@example.com</pr:target_entity>
       <pr:valid_time>
         <pr:from/>
         <pr:until/>
       </pr:valid_time>
     </conditions>
     <actions>
     <actions>
</pr:publish_rule>

FIG.13J (x) SIP/2.0 200 OK
Via: SIP/2.0/TCP ua1.example.com;branch=z9G4bKcccc; received=192.0.1.1
From: <sip:brian@example.com>;tag=9090
To: <sip:brian@example.com>; tag=ijij
Call-ID: 2020@ua1.example.com
CSeq: 12 MESSAGE
Content-Length: 0

(y) NOTIFY sip:brian@ua1.example.com SIP/2.0
Via: SIP/2.0/TCP epa2.example.com; branch=z9hG4bKdddd
From: <sip:brian@example.com>; tag=abcd
To: <sip:brian@example.com>; tag=1234
Call-ID: 1111@ua1.example.com
CSeq: 13 NOTIFY
Event: publish
Subscription-State: active; expires=18000
Max-Forwards: 70
Contact: <sip:brian@epa2.example.com>
Content-Type: application/pub_rule+xml
Content-Length: ….
<?xml version="1.0" encoding="UTF-8"?>
<pr:publish_rule xmlns="urn:ietf:params:xml:ns:common-policy"
         xmlns:pr="urn:oma:params:xml:ns:publish-rules">
</pr:publish_rule>

(z) SIP/2.0 200 OK
Via: SIP/2.0/TCP epa2.example.com; branch=z9hG4bKdddd; received=192.0.1.4
From: <sip:brian@example.com>; tag=abcd
To: <sip:brian@example.com>; tag=1234
Call-ID: 1111@ua1.example.com
CSeq: 13 NOTIFY
Content-Length: 0

FIG.13K

SYSTEM AND METHOD FOR PROVIDING A PRESENCE SERVICE

PRIORITY

This application claims priority under 35 U.S.C. §119 to applications filed in the Korean Intellectual Property Office on Dec. 7, 2005 and assigned Serial No. 2005-119017, and on Dec. 7, 2006 and assigned Serial No. 2006-123458, the contents of which are incorporated herein by reference.

BACKGROUND OF THE INVENTION

1. Field of the Invention

The present invention generally relates to Presence Services, and more particularly to a system and method for controlling an operation of a Presence Source through external objects including a Presence Server.

2. Description of the Related Art

Conventionally, a Presence Service is a service that appropriately provides a set of objects with, for example, information about an ability and willingness of communication and a current status of a user or group corresponding to a target of interest, through a set of devices. The objects can detect the current status of the interest target based on received status information thereof, and can attempt contact with the interest target by selecting the best communication scheme.

FIG. 1 shows a Presence Service according to the prior art. A target of interest in the Presence Service is referred to as a Presentity. Information about the Presentity, i.e., Presence Information (PI), is published to a Presence Server 102 through Presence Sources 104. The Presence Server 102 composes the PI, generates the composed PI of the Presentity, and selectively sends notification of authorized PI to a subscribed Watcher 100 having an interest to the Presentity.

A signal flow between entities of Presence Service according to the prior art will be described with reference to FIG. 2 A publication mechanism defined in Request for Comments (RFC) 3856 ("A Presence Event Package for the Session Initiation Protocol (SIP)", by J. Rosenberg, August 2004), is applied between the Presence Sources 104 and the Presence Server 102. The Presence Source 104 or Event Publication Agents (EPA) transfers the PI about the Presentity to the Presence Server 102 or an Event State Compositor (ESC) using a Session Initiation Protocol (SIP) PUBLISH message in steps 204 and 205, steps 208 and 209, and steps 210 and 211. The Presence Server 102 for performing a composition function for the PI is referred to as the ESC. Further, the Presence Source 104 for performing a function for providing the PI is referred to as the EPA.

On the other hand, a Presence Event Package defined in RFC 3856 is applied between the Watcher 100 and the Presence Server 102. The Watcher 100 requests the PI for the Presentity using an SIP SUBSCRIBE message for a Presence Event in steps 200 to 203.

The Presence Server 102 or a Presence Agent (PA) transfers the PI received from the Presence Source 104 or a Presence User Agent (PUA) to the Watcher 100 using a SIP NOTIFY message in steps 204, 208, and 210.

An example of formats of messages used for the signal flow of FIG. 2 is illustrated in FIGS. 3A to 3D. Messages capable of being sent in steps 200 to 213 correspond to (a) to (n) of FIGS. 3A to 3D, respectively.

The Presence Service as described above can be implemented in Open Mobile al.liance (OMA) Presence SIMPLE V1.0. The architecture of OMA Presence SIMPLE V1.0 for supporting a Presence Service according to the prior art is shown in FIG. 4.

In the conventional Presence Service architecture, the Presence Source 104 maintains up-to-date PI about the Presentity viewed from a point-of-view thereof and transfers the PI to the Presence Server 102 through a SIP PUBLISH message whenever the PI is updated or changed. The Presence Server 102 composes the PI received from the Presence Sources 104 according to a predefined mechanism and maintains up-to-date composed PI. Further, the Presence Server 102 properly distributes the PI according to predefined policy using a SIP NOTIFY message in response to a SIP SUBSCRIBE request using a Presence Event Package of the Watcher 100. The SIP SUBSCRIBE request using the Presence Event Package of the Watcher 100 is a request for receiving the PI whenever the PI is updated.

FIG. 5 shows an operation of the Presence Source 104 according to the prior art.

When the Presence Source 104 is enabled in step 500, the Presence Source 104 determines whether PI about the Presentity is present in step 502. If the PI is present, the Presence Source 104 proceeds to step 504 to publish the PI to the Presence Server 102. Then, if the published PI is updated in step 506, the Presence Source 104 proceeds to step 508 and publishes the updated PI to the Presence Server 102.

Accordingly, the following behaviors are observed in the Presence Source 104.

The behavior of the Presence Source 104 is implicit. In the Presence Service shown in FIG. 1, it is assumed that the Presence Source 104 constantly performs a proper operation. Because there is not a method for enabling or disabling the operation of the Presence Source 104, the behavior of the Presence Source 104 is implicit.

The behavior of the Presence Source 104 is also independent. The Presence Source 104 independently determines whether update of the PI about the Presentity is present. Whenever the PI is updated, the Presence Source 104 determines and performs publication. That is, because the Presence Source 104 independently performs a determination or control without an external request or control, the behavior of the Presence Source 104 is independent.

As described in PDM (Draft-Ietf-Simple-Presence-Data-Model-06, "A Data Model for Presence", by J. Rosenberg on Oct. 23, 2005), the above-described observations on the behaviors of the Presence Source 104 can be regarded negligible in the conventional architecture in relation to the existing purpose of the Presence Service for notification of the ability and willingness of communication using a set of devices of a predetermined user (i.e., Presentity). This is because, in the existing architecture, the PI is mostly composed of such discrete information as the communication ability and willingness, rather than continuous one. The Presence Sources for publication in the existing architecture are mostly configured with such persistent network entities as a user terminal or Home Subscriber Server (HSS). As such, the operation of the Presence Sources 104 is directly enabled/disabled and is independent.

However, as seen also in RPID (Draft-Ietf-Simple-Rpid-09, "RPID: Rich Presence Extensions to the Presence Information Data format", H. Schulzrine et al., Sep. 24, 2005), the observed behaviors of the Presence Source 104 have the following problems when it is considered that the inherent purpose of the Presence Service for transferring information about the communication ability and willingness of a Presentity is being extended to a mechanism for providing various information about the Presentity, such as the current status thereof.

The implicit behavior of the Presence Source 104 disables a selective PI request and publication for the PI. For example, if the Presentity desires to know a snapshot of a used device at a particular time, the Presentity should transfer a PI publication request to an associated Presence Source so the snapshot of the associated PI can be published. In the Presence Service shown in FIG. 1, the Watcher can selectively send a request for a particular part of the PI using a filter method as described in Draft-Ietf-Simple-Event-Filter-Funct-05, "Functional Description of Event Notification Filtering", H. Khartabil et al., Mar. 15, 2005. If the Presence Source responsible for publishing the associated information to the Presence Server 104 is not pre-activated, the Watcher cannot know the requested PI.

The independent behavior of the Presence Source 104 can cause an uncontrollable result. For example, when PI corresponding to a target of publication of a predetermined Presence Source is location information, the Presence Source 104 will publish the associated PI to the Presence Server 102 whenever the location information is updated. However, characteristics of quasi-continuous location information cause too frequent PI update and publication to give burden to an SIP based network and require high processing capability of the Presence Source 104 and the Presence Server 102. In RFC 3903 ("Session Initiation Protocol (SIP) Extension for Event State Publication", A. Niemi et al., October 2004), a mechanism is proposed in which the Presence Server 102 can indirectly control a publication rate of the Presence Source 104 using a method for adjusting a publication expiration interval and including a Retry-After SIP header in a 503 Server Unavailable SIP response. However, the method for adjusting the publication expiration interval is used only for controlling the publication rate to refresh PI, but is not used for updating the PI. The method using the Retry-After SIP header is applied only to the next publication. Thus, the methods proposed in RFC 3903 are very limited for use and cannot be a fundamental resolution.

SUMMARY OF THE INVENTION

Therefore, the present invention provides a system and method for controlling an operation of a presence source through external objects. In particular, the present invention provides a system and method that can control a publication operation of an Event Publication Agent (EPA) through external objects including an Event State Compositor (ESC).

Moreover, the present invention provides a system and method that can make solicitation for a particular state by activating and deactivating an EPA on-demand.

In accordance with one aspect of the present invention, there is provided a system for providing a presence service, the system including a Ruler for describing a requested publication operation of an EPA for target presence state information using a Publication Rule, sending the Publication Rule to an EPA responsible for publication of the target presence state information of concern, updating or canceling the Publication Rule according to need, and sending a Publication Rule synchronization request to the EPA using an event package; an EPA for registering its publication capability on a set of presence state information to a SIP Registrar using a Media Feature Tag, receiving and composing Publication Rules for the presence state information from Rulers, performing publication to an Event State Compositor (ESC) for the presence state information according to the composed Publication Rules, modifying the Publication Rule upon its update or cancel request from Rulers, changing the publication behavior to the ESC for the presence state information according to the modified Publication Rule, sending as a response message a most up-to-date Publication Rule to a Ruler who has requested the Publication Rule synchronization request using the event package, and notifying the Publication Rule synchronization requesting Ruler of further updates of the Publication Rule; and an SIP Registrar for registering EPA with its publication capability on the set of presence information using a Media Feature Tag as requested by EPA, deciding the routing of Publication Rule for target presence state information to the EPA responsible for publication of the target presence state information according to Media Feature Tag information as registered by the EPA.

In accordance with another aspect of the present invention, there is provided a method for providing a presence service, the method including registering an EPA with its publication capability on a set of presence state information using a Media Feature Tag according to an SIP; sending a Publication Rule for target presence state information from a Ruler to an associated EPA; routing the Publication Rule for the target presence state information to an EPA responsible for publication of the target presence state information according to Media Feature Tag information as registered by the EPA; receiving, by the EPA, the Publication Rule; performing, by the EPA, publication to an ESC for the target presence state information according to the Publication Rule; requesting, by the Ruler, to update or cancel the Publication Rule; receiving, by the EPA, the request from Ruler to update or cancel the Publication Rule and modifying the Publication Rule accordingly; performing, by the EPA, publication to the ESC according to the modified Publication Rule; sending, by Ruler, Publication Rule synchronization request to EPA using the event package as proposed in the present invention; sending, by the EPA, as a response message to the Publication Rule synchronization a request from the Ruler for a most up-to-date Publication Rule to the requesting Ruler; and sending notification of further updates of the Publication Rule from the EPA to the Publication Rule synchronization requesting Ruler.

Herein, User Agent, ESC or any entity can function as a Ruler. An EPA that receives the Publication Rule request authorizes whether the requesting entity can function as Ruler.

BRIEF DESCRIPTION OF THE DRAWINGS

The above and other features, advantages and aspects of the present invention will be more clearly understood from the following detailed description taken in conjunction with the accompanying drawings, in which:

FIGS. 3A to 3D illustrate formats of transmitted and received messages when the Presence Service of FIG. 2 is provided;

FIG. 6 illustrates a rule for publishing a state at a regular interval in accordance with the present invention;

FIG. 7 illustrates a rule for instantly publishing a state in accordance with the present invention;

FIG. 8 illustrates a rule for canceling a Publication Rule in accordance with the present invention;

FIG. 10 illustrates formats of messages transmitted and received in an EPA registration process of FIG. 9;

FIGS. 12 and 13A to 13K illustrate formats of messages transmitted and received in a signal flow of the EPA control mechanism of FIG. 11.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 14:
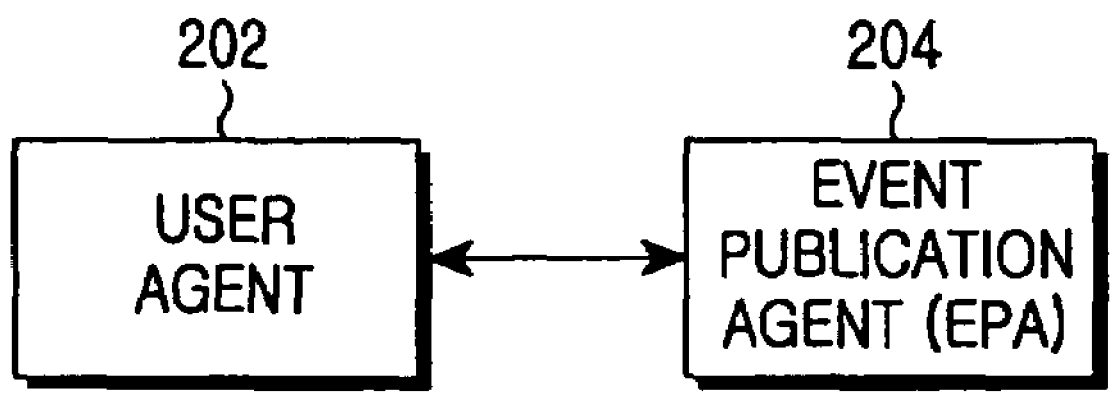
FIG. 14 is a block diagram of a system according to the present invention.

The present invention provides a system and method for controlling an operation of a presence source through external objects. The system includes a user agent 202 and an Event Publication Agent (EPA) 204, as shown in FIG. 14. The user agent 202 is for sending a publication rule synchronization request to the EPA 204 using an event package and sending a publication rule including target state information to the EPA 204 when a response to the synchronization request is present. The EPA 204 is for sending a response message to the user agent 202 when the publication rule synchronization request is received from the user agent 202, and notifying the user agent 202 of an updated publication rule when the publication rule is updated.

To control an EPA, the present invention provides (1) a method for describing and expressing a Publication Rule, (2) a method for transferring the Publication Rule, (3) a method for processing the Publication Rule, (4) a method for synchronizing the Publication Rule, (5) a method for updating the Publication Rule, (6) a method for canceling the Publication Rule, (7) an EPA identification and routing method, and (8) a method for implementing the Publication Rule.

(1) Method for Describing and Expressing Publication Rule

A method for describing and expressing EPA control parameters or a Publication Rule in the present invention will be described.

Referring to the Publication Rule description method, the EPA control parameter description is divided into header information and Publication Rule information in the present invention.

The header information is used to transfer the described Publication Rule to the EPA and compose the Publication Rule in the EPA. The Publication Rule is used to describe parameters capable of controlling publication of EPA. The header information is described as general information about the Publication Rule. In relation to the above-described information, details of routing to the EPA and presence rule composition of the EPA will be described below. The header information is used to apply the described Publication Rule. The header information can include information about a requester, a time stamp, an EPA to control, a target state to control, and a target entity to control.

The requestor information is about an entity making an EPA control request. The information describes a Session Initiation Protocol (SIP) Uniform Resource Identifier (URI) of the requestor, and is used for EPA to authorize the requestor whether the requestor has the right to control publication of an associated state according to the Publication Rule described by the requestor.

The time stamp information indicates a point of time when the Publication Rule is requested.

The information about the EPA to control indicates an SIP URI for identifying the EPA to control. For this, a Globally Routable User Agent URI (GRUU) per Draft-Ietf-Sip-Gruu-06, "Obtaining and Using Globally Routable User Agent (UA) URIs (GRUU) in the Session Initiation Procotol (SIP)", J. Rosenberg, Oct. 20, 2005, can be used. Thus, this information is used as routing information when the Publication Rule is transferred to the EPA. If this information is not described, a routing proxy can find information for routing to a target EPA by using information elements about a target state and a target entity. If both information elements are available, the routing information based on the information about the EPA to control has a higher use priority than that implied by the target state and entity information.

The information about the target state to control designates the target state corresponding to a target of publication control. For example, the information about the target state to control can be location state information. This information value is indicated in a Media Feature Tag per capability registration at the time of SIP registration of the EPA. The information about the target state to control can be used as routing information for identifying the EPA responsible for state publication, along with the target entity information. However, if the URI information of the EPA is already described by the information about the EPA to control, the URI information is first used as the routing information.

The information about the target entity to control indicates an entity corresponding to a target of publication control. For example, the information about the target entity to control is information, such as "sip:brian@example.com". The SIP Address of Record (AOR) of an entity is described here. This information can also be used as routing information for identifying the EPA responsible for state publication, along with the target state information. However, if the URI information of the EPA is already described by the information about the EPA to control, the URI information is first used as the routing information.

Next, the Publication Rule information will be described. The present invention provides the Publication Rule including information about a target state to control, a target entity to control, a valid time, and a publication trigger mechanism, state maximum accuracy information, and cancel information.

The information about the target state to control indicates a state to which the Publication Rule is applied. The value of this information is the Media Feature Tag that the EPA has registered as publication capability at the time of SIP registration of the EPA.

The information about the target entity to control indicates a target entity to which the Publication Rule is applied and is expressed by an SIP AOR URI of the target entity.

The valid time information indicates a valid time of the described Publication Rule. This is expressed by a "Duration" value or a combination of "From" and "Until" values. When the valid time is expressed by the "From/Until" value, the "From" value indicates a start time of a rule application and the "Until" value indicates an end time of the rule application. An indefinite time applies when the values are not described. That is, if the "From" value is described but the "Until" value is not described, the rule is continuously valid from the "From" time to a rule cancel time. If only the "Until" value is described, the provided rule is immediately applied. Unless the rule is canceled, the rule is valid until the "Until" time. When the valid time is expressed by the "Duration" value, the value is expressed in 'second'. As long as the rule is not canceled before finishing, the rule is applied during the "Duration" time. If al.l the "From", "Until", and "Duration" values are not described, the rule is indefinitely valid until cancellation. However, an invalid time applies when al.l the "From", "Until", and "Duration" values are described. When the "Duration" value is 0, the described rule is instantly applied and the EPA should publish a state set by the target entity and the target state, to an Event State Compositor (ESC). After publishing, this rule is meaningless and is deleted from a rule set of the EPA.

The publication trigger mechanism information describes a method for triggering publication of an associated state. For example, this information includes information about a method for performing publication whenever the associated state is updated and a method for performing publication at a regular time interval.

The state maximum accuracy information describes the maximum accuracy of a target state to be published. The accuracy of the target state to be published must be lower than the maximum accuracy. The accuracy is differentially defined according to an associated state.

The cancel information is used to delete the Publication Rule with respect to a state set by a target entity and a target state during the described valid time. When the valid time is not described, every existing Publication Rule is deleted with respect to the state set by the target entity and the target state. When the Publication Rule is absent, a default Publication Rule is applied for the publication of the state to the ESC, which is to publish when an associated state is updated, as defined in RFC 3903.

Next, the method for expressing the Publication Rule will be described. The present invention provides a method for expressing the above-described information in Extensible Markup Language (XML). A method for transferring the Publication Rule will be described with reference to FIGS. 6 to 8. FIG. 6 shows a rule for publishing a state in regular interval. FIG. 7 shows a rule for instantly publishing a state in accordance with the present invention. FIG. 8 shows a rule for canceling an existing Publication Rule in accordance with the present invention.

EPA control parameters of the Publication Rule can be expressed in XML. FIG. 6 shows an example of the Publication Rule including the EPA control parameters expressed in XML. Referring to FIG. 6, the header information as described with reference to method (1) is expressed by child elements of a <Header> element. The requestor information, the time stamp information, the information about the EPA to control, the information about the target state to control, and the information about the target entity to control are expressed by <requestor>, <time>, <target_contact>, <target_state>, and <target_entity>, respectively. In FIG. 6, the requestor is the ESC located in a domain of "example.com" described by "esc.example.com"The EPA to control publishes a location state of an entity expressed by "sip:brian@example.com". Because a value for the EPA to control is not shown in FIG. 6, a proxy of "example.com" sets the EPA(s) based on values of the target state and the target entity and routes a message to the associated EPA(s).

The Publication Rule information can be expressed based on a common-policy framework described in Common-Policy (Draft-Ietf-Geopriv-Common-Policy-06, "A Document Format for Expressing Privacy Preferences", J. Rosenberg, Oct. 23, 2005). According to Common-Policy, only if al.l items described under a <conditions> element are satisfied, then those items described under <actions> elements are executed and information is transformed according to those items described under a <transforms> element. Thus, the target state to control, the target entity to control, and the valid time are expressed by <target_state>, <target_entity>, and <valid_time> corresponding to the child elements, respectively. The publication trigger mechanism is expressed by <trigger> serving as a child element of <actions>. The state maximum accuracy is expressed by <max_accuracy> serving as a child element of <transformations>. The cancel information can be expressed by a child element of <actions>. Further, <interval> and <update> can be defined by child elements of <trigger> and indicate a method for periodically publishing an associated state at a designated interval and a method for publishing an associated state when update is present, respectively.

In accordance with the present invention, the Publication Rule of FIG. 6 relates to a method for publishing a location state of "sip:brian@example.com". The rule request that the EPA periodically publish the location state of "sip:brian@example.com" to the ESC in every 1800 seconds and the accuracy of the location information be at maximum 100 meters. That is, more detailed information beyond 100 meters must not be published. From FIG. 6, it can be seen that this Publication Rule is valid from 2005-08-14T09:00 (GMT+9) to 2005-09-14T23:00 (GMT+9).

FIG. 7 shows the Publication Rule requesting that the EPA instantly publish the state of "ua-prof" of "sip:brian@example.com" to the ESC.

FIG. 8 shows the Publication Rule requesting that every existing Publication Rule relating to the "game" state of "sip:brian@example.com" be canceled and removed.

In the Publication Rule expressed in XML, a Multipurpose Internet Mail Extensions (MIME) content type should be defined. For example, "application/pub_rule+xml" can be used as the MIME content type of the Publication Rule in accordance with the present invention.

(2) Method for Transferring EPA Control Parameters or Publication Rule

The present invention provides a method for transferring a Publication Rule as described with reference to method (1) using an SIP MESSAGE request defined in RFC 3428 ("Session Initiation Procotocl (SIP) Extension for Instant Messaging, B. Campbell et al.", December 2003), or a new SIP method, for example, PUBLISHREQ.

When the SIP MESSAGE request is used, the method follows RFC 3428. Additionally, the present invention provides the following operations.

As described with reference to method (1), the Publication Rule is expressed in XML, included in the body of the SIP MESSAGE request, then transferred to the associated EPA that is in charge of publishing the target state to be controlled per the embodied Publication Rule. Thus, a content type of the body indicates the Publication Rule and can be a value of "application/pub_rule+xml".

A request URI of the SIP MESSAGE request is an SIP AOR URI of a target to which the Publication Rule described in the body is to be applied, and corresponds to the value of <target_entity> described in a header of a presence rule.

A "To" header field of the SIP MESSAGE request indicates an SIP AOR URI of a target to which the Publication Rule described in the body is applied. Thus, a value of the "To" header field corresponds to the value of <target_entity> described in the header of the presence rule.

A "From" header field of the SIP MESSAGE request is used for logical identification of an entity sending the request. Thus, a value of the "From" header field corresponds to the value of <requestor> described in the header of the Publication Rule.

When the associated Publication Rule is applied to multiple EPAs, an entity responsible for routing such as an SIP proxy forks the SIP MESSAGE request and transfers it to each EPA. As defined in RFC 3428, only one of 200-class final responses from the EPAs is transferred to an SIP message requestor. The transferred response must not be regarded as a unique 200-class final response. Each EPA and the SIP MESSAGE requestor must be regarded as independent operation.

(3) Method for Processing EPA Control Parameters or Publication Rule

The present invention provides a method in which the EPA processes a Publication Rule received through method (2).

The EPA determines whether the requester is authorized to request the Publication Rule, using requestor information in the received Publication Rule. That is, the EPA verifies authorization for the Publication Rule request of the requestor. If the requestor is not authorized, the EPA rejects the received Publication Rule. Otherwise, the EPA applies the next step.

The EPA composes the received Publication Rule with the existing Publication Rule, if any. The EPA performs a composition operation so only one Publication Rule can be applied at a certain time. When at least two Publication Rules conflict with each other, the EPA appropriately resolves the conflict. For example, when two trigger mechanisms with different intervals are present, one of the two mechanisms is selected according to a predefined rule. This conflict resolution method may differ according to a target state.

A 200 OK response is sent as a final response to an SIP MESSAGE request after successful Publication Rule composition.

An associated state is published to the ESC using an SIP PUBLISH request defined in RFC 3903 according to the processed Publication Rule.

(4) Synchronization of Publication Rule

Multiple EPA Publication Rules can be transferred to an EPA through method (2) and are processed and composed through method (3). A final Publication Rule processed in the EPA needs to be synchronized to entities requesting the Publication Rule or capable of later requesting it.

For synchronization of an EPA Publication Rule, the present invention provides a new event package called "publish_rule". The event package follows a framework of a basic SIP event package defined in RFC 3265 ("Session Initiation Protocol (SIP)-Specific Event Notification", A. B. Roach, June 2002), and an operation therefore is as follows A request for synchronization of a Publication Rule stored in the EPA is made through an SIP SUBSCRIBE request for a "publish_rule" event. The SIP SUBSCRIBE message is constructed as follows. Because the SIP SUBSCRIBE message should be routed like the SIP MESSAGE request as described with reference to method (2), the header of the SIP SUBSCRIBE message is basically similar to an SIP header of the SIP MESSAGE request. However, the SIP SUBSCRIBE request is different from the SIP MESSAGE request in which the Publication Rule is included in the body. No information is included in the body of the SIP SUBSCRIBE request. Routing information elements about the target contact, target state, and target entity are entered as parameters of the "publish_rule" event header.

A request URI of the SIP SUBSCRIBE request is an SIP AOR URI of a target to which the Publication Rule is to be applied, i.e., the target entity, alternatively, an instance of a particular EPA may be directly designated through a GRUU based method.

A "To" header field of the SIP SUBSCRIBE request indicates an SIP AOR URI of a target to which the described Publication Rule is to be applied, i.e., the target entity.

A "From" header field of the SIP SUBSCRIBE request is used for logical identification of an entity sending the request. Thus, a value of the "From" header field corresponds to the value of <requestor> described in the header of the Publication Rule.

An "Event" header field of the SIP SUBSCRIBE request has a value of "publish_rule", and defines a target state and a target entity corresponding to header information of the Publication Rule. That is, information for identifying Publication Rules is provided as parameters in the SIP SUBSCRIBE request.

An "Accept" header field of the SIP SUBSCRIBE request indicates a value of a Publication Rule. As described with reference to method (1), the "Accept" header field indicates "application/pub_rule+xml".

A "Contact" header field of the SIP SUBSCRIBE request indicates an SIP URI of a substantial entity sending the SIP SUBSCRIBE request. This is used when the EPA later sends an SIP NOTIFY message.

An "Expire" header field of the SIP SUBSCRIBE request indicates a valid time of a "publish_rule" event package in the unit of seconds.

When the associated Publication Rule is applied to multiple EPAs, an entity responsible for routing, such as an SIP proxy, forks the SIP SUBSCRIBE request and transfers it to each EPA. As defined in RFC 3265, only one of 200-class final responses from the EPAs is transferred to an SIP message requestor. The transferred response must not be regarded as a unique 200-class final response. Each EPA and the SIP SUBSCRIBE requestor must be regarded as different instances of "publish_rule" event package.

The SIP SUBSCRIBE request transferred to the EPA is processed based on a basic framework defined in RFC 3265 and an operation therefore is as follows.

It is determined whether the SIP SUBSCRIBE requestor indicated by the "From" header field is authorized to access Publication Rule information requested through the "Event" header field. The default authorization is assigned to the target entity of the associated Publication Rule. If access authorization is absent, the associated SIP SUBSCRIBE request is rejected. Otherwise, a 200 OK message is sent.

A snapshot, held in the current EPA, of the associated Publication Rule is contained in an SIP NOTIFY request to be described below and is sent to the requester, immediately after the 200 OK message is sent.

A method for creating a NOTIFY request of the "publish_rule" event package is processed based on a framework defined in RFC 3265, and an operation therefore is as follows.

A request URI of the SIP NOTIFY request uses a "Contact" header field value of the corresponding SIP SUBSCRIBE request.

An "Event" header field of the SIP NOTIFY request has a value of "publish_rule".

A "Subscription-State" header field of the SIP NOTIFY request has a value of "active". The remaining valid time of the event package is indicated by an "expires" parameter.

The "Contact" header field indicates the SIP URI of the current EPA. When a GRUU is supported, a GRUU value is described.

A "Content-Type" header field of the SIP NOTIFY request indicates a value of "application/publish_rule+xml".

A "Content-Length" header field of the SIP NOTIFY request indicates a size of Publication Rule information to be contained in the body in a unit of bytes.

The body of the SIP NOTIFY request describes a snapshot of a requested Publication Rule held in the current EPA.

When successfully receiving the SIP NOTIFY request, the subscriber of a "publish_rule" event sends a 200 OK message as a response.

Whenever a subscribed Publication Rule is updated, the associated Publication Rule is transferred to the subscriber through the SIP NOTIFY request as long as the valid time of the "publish_rule" event remains.

However, when a "duration" value indicating the valid time of the Publication Rule is set to 0 as described with reference to method (1), the associated Publication Rule is immediately published and is deleted after publishing. Because this case does not affect the existing Publication Rule, the existing Publication Rule is not updated and therefore the SIP NOTIFY request is not generated.

(5) Method for Updating EPA Control Parameters or Publication Rule

Publication rules of the EPA transferred and processed per methods (2) and (3) can be updated through the same process. That is, a Publication Rule to be updated is included in the body of the SIP MESSAGE request and is transferred to the associated EPA. The associated EPA sends a response including a processing result to the requestor. After PI composition, the Publication Rule can be synchronized to entities other than the EPA through a "publish_rule" event package of method (4).

(6) Method for Canceling EPA Control Parameters or Publication Rule

A Publication Rule can be canceled using method (1). A request for canceling the Publication Rule can be made in a particular time or every time. When the cancel request is transferred to the EPA through the SIP MESSAGE request of method (2), the EPA processes the cancel request according to method (3) and deletes the Publication Rule during a defined time.

FIG. 8 shows an example of a Publication Rule including a cancel request. FIG. 8 shows a case of requesting that the EPA for publishing a "game" state of "sip:brian@example.com" should cancel al.l existing Publication Rules.

(7) EPA Identification and Routing Method: SIP Registration of EPA Capability

A method for appropriately transferring a Publication Rule to an EPA is needed to implement an EPA control mechanism according to the present invention. For this, the present invention provides a process for registering and employing state publication capability of a particular EPA in an underlying SIP network using a Media Feature Tag defined in RFC 3840 ("Indicating User Agent Capabilities in the Session Initiation Protocol (SIP)", J. Rosenberg et al., August 2004).

An EPA is responsible for publishing a target state of a target entity to the ESC. Thus, the underlying SIP network identifies the EPA responsible for publishing a particular state based on a target state and a target entity as described with reference to method (1), thereby routing information to the associated EPA. For this, the underlying SIP network should store information about the EPA, the target entity, and the target state of the target entity to be published from the EPA, i.e., EPA capability information.

The present invention provides two methods for storing the above-described information in the underlying SIP network.

When the EPA capability information is static, for example, a location server, an administration can directly sets the static EPA in the underlying SIP network through administration, so the static EPA information can be used for later routing to the EPA.

Second, when the EPA capability information is dynamic, that is, the EPA capability information can be changed as a User Agent (UA) can, SIP registration defined in RFC 3261, SIP: Session Initiation Protocol, J. Rosenberg et al., June 2002, is performed using a Media Feature Tag defined in RFC 3840. Then, the EPA capability information is registered in an SIP Registrar and is later used for routing to the EPA.

A Media Feature Tag relative to a particular state can be defined per RFC 2506 ("Media Feature Tag Registration Procedure", K. Holtman et al., March 1999). For example, the capability to publish a UA profile can be defined as "+g.publish.ua-prof" in a global tree defined in RFC 2506.

Figure 1:
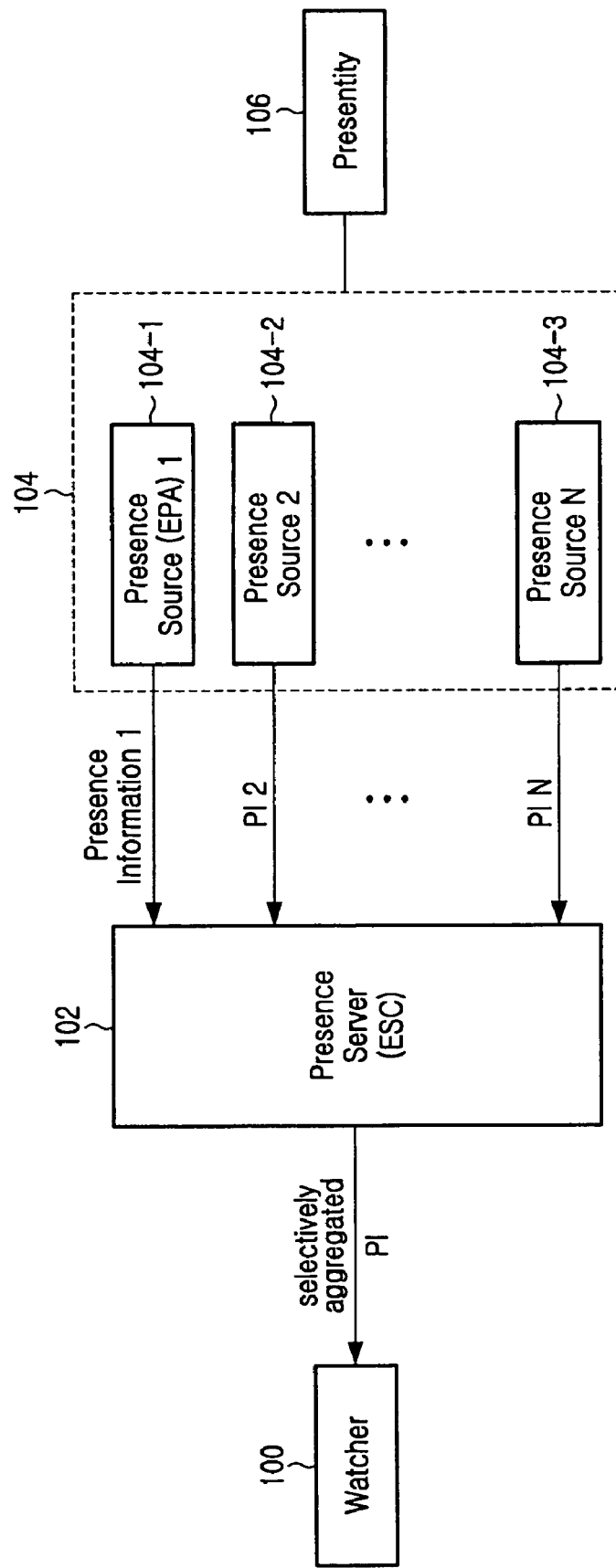
FIG. 1 illustrates an architecture for implementing a Presence Service according to the prior art.
Figure 2:
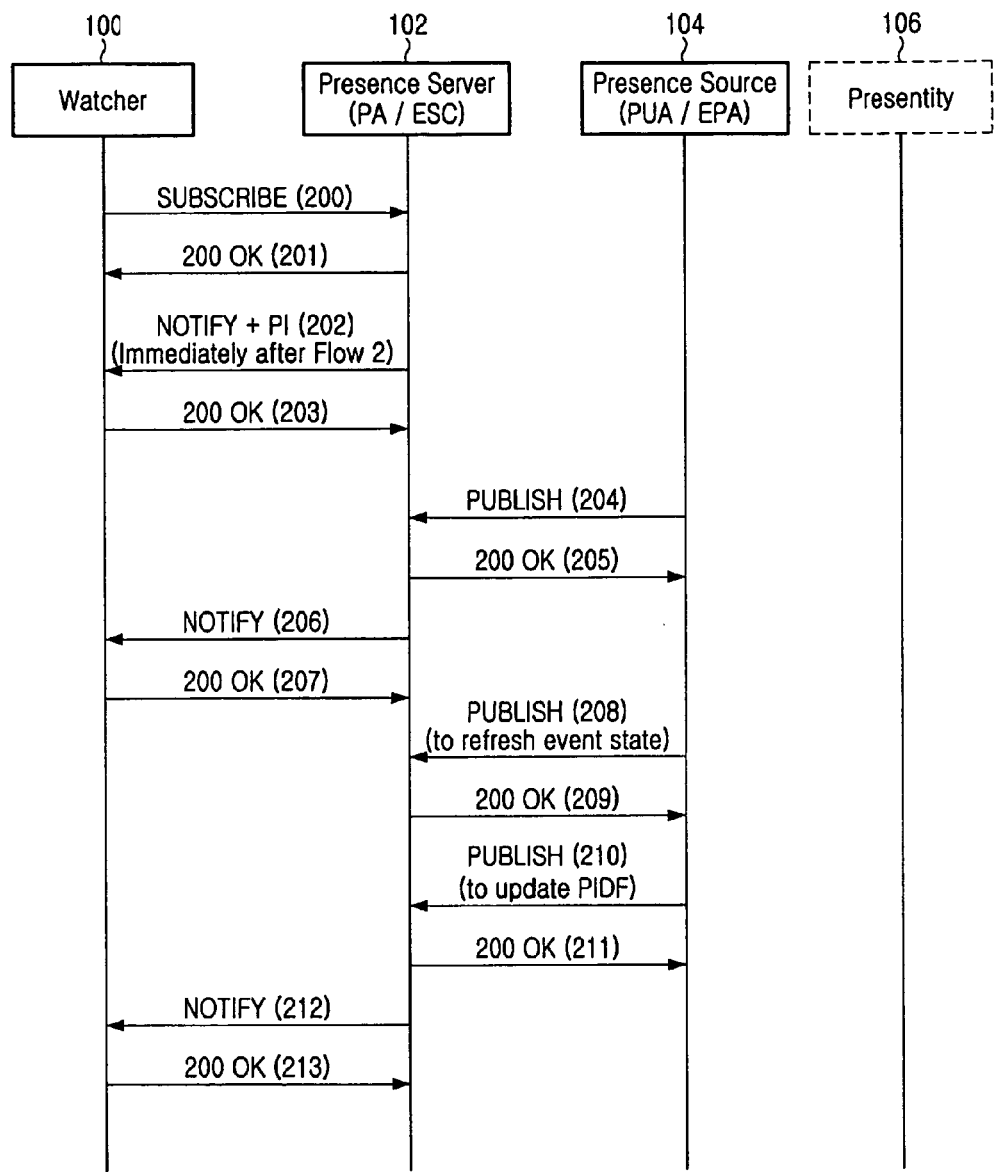
FIG. 2 is a signal flow diagram illustrating a Presence Service according to the prior art.
Figure 4:
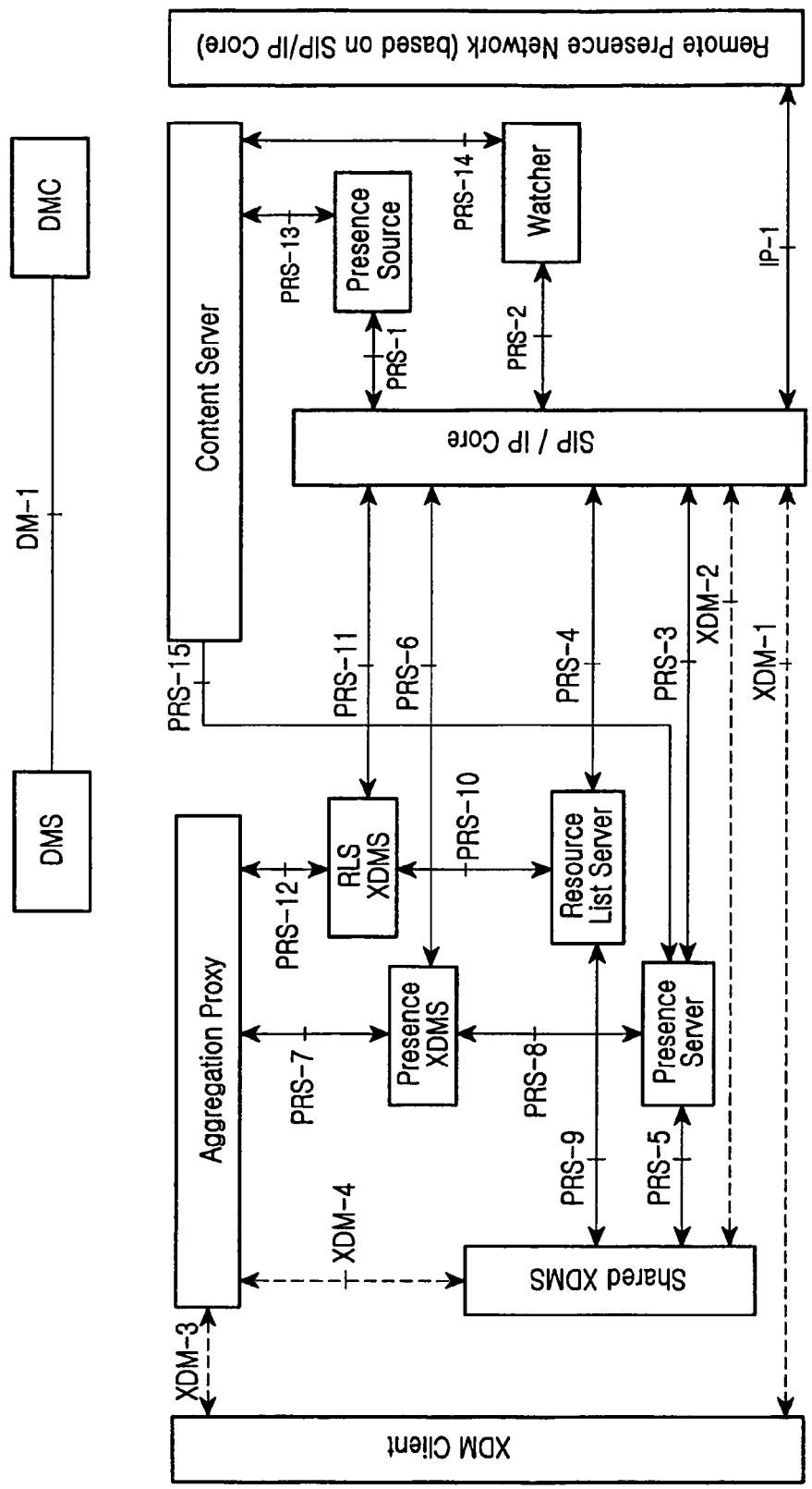
FIG. 4 illustrates an architecture for Open Mobile al.liance (OMA) Presence SIMPLE V1.0 according to the prior art.
Figure 5:
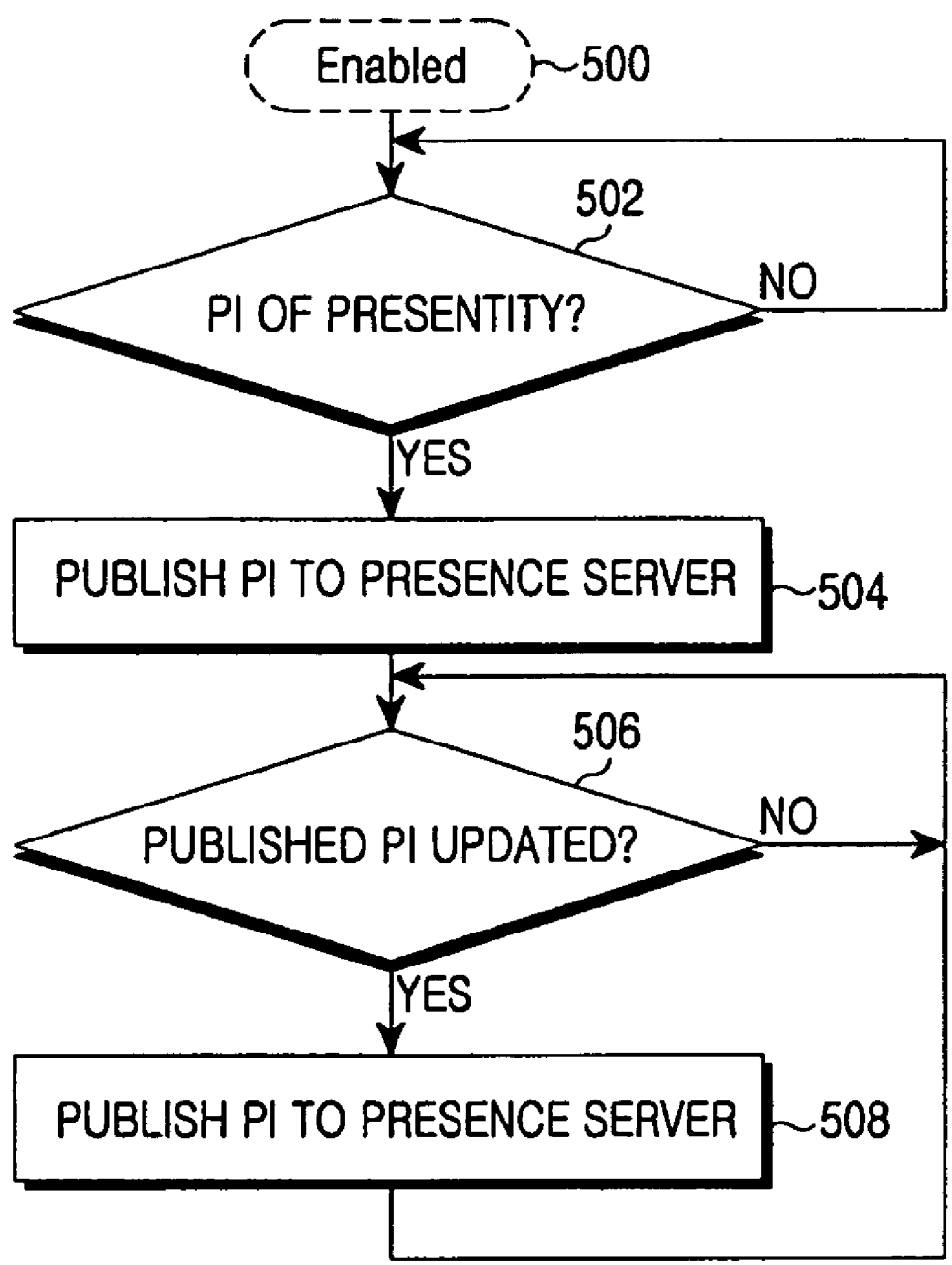
FIG. 5 is a flowchart illustrating an operation of the Presence Source for Presence Service according to the prior art.
Figure 9:
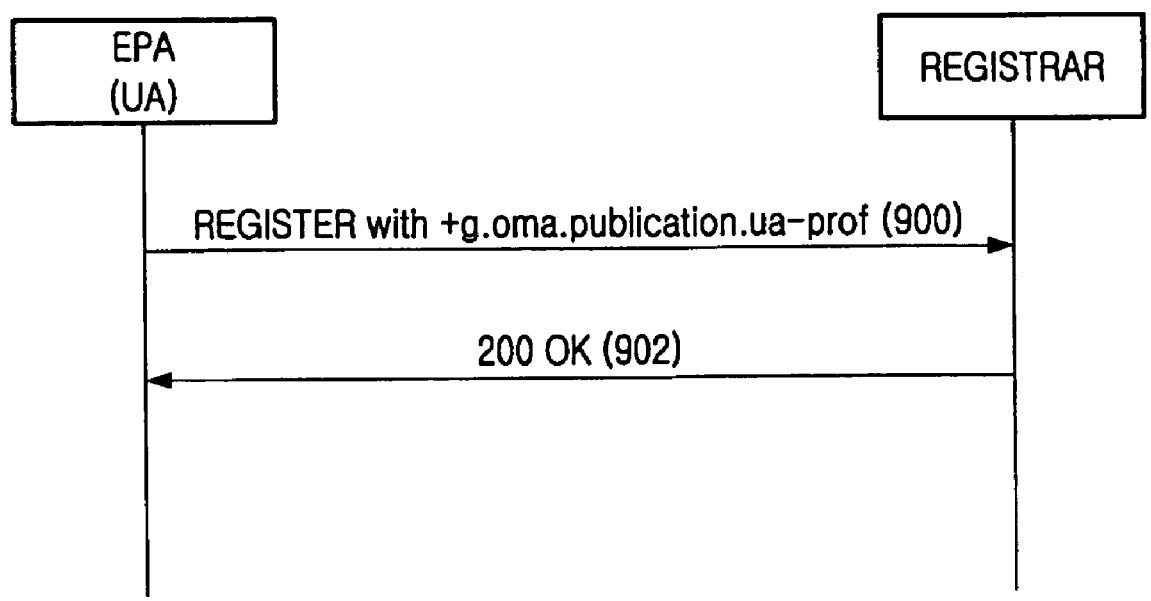
FIG. 9 is a signal flow diagram between an Event Publication Agent (EPA) and a Registrar for EPA registration in accordance with the present invention.

FIG. 9 shows a signal flow illustrating a process in which the UA with an address of "sip:ual.example.com" registers the capability to publish a UA-profile state for "sip:brian@example.com" through SIP registration. FIG. 10 shows an example of formats of messages for the signal flow of FIG. 9.

In FIG. 9, an EPA sends a REGISTER message to a Registrar using the message format as shown in format (a) of FIG. 10 in step 900. In step 902, the Registrar receives the REGISTER message and sends a response of a 200 OK message to the EPA.

In addition to the above-described method, EPA identification and routing can also be performed using a GRUU per draft-ietf-sip-gruu-06. That is, as described with reference to "EPA to control" of method (1), direct EPA identification and routing can be performed using the GRUU when the EPA corresponding to a target of publication control can be directly expressed using the GRUU.

(8) Method for Implementing EPA Control Mechanism or Publication Rule

Figure 11:
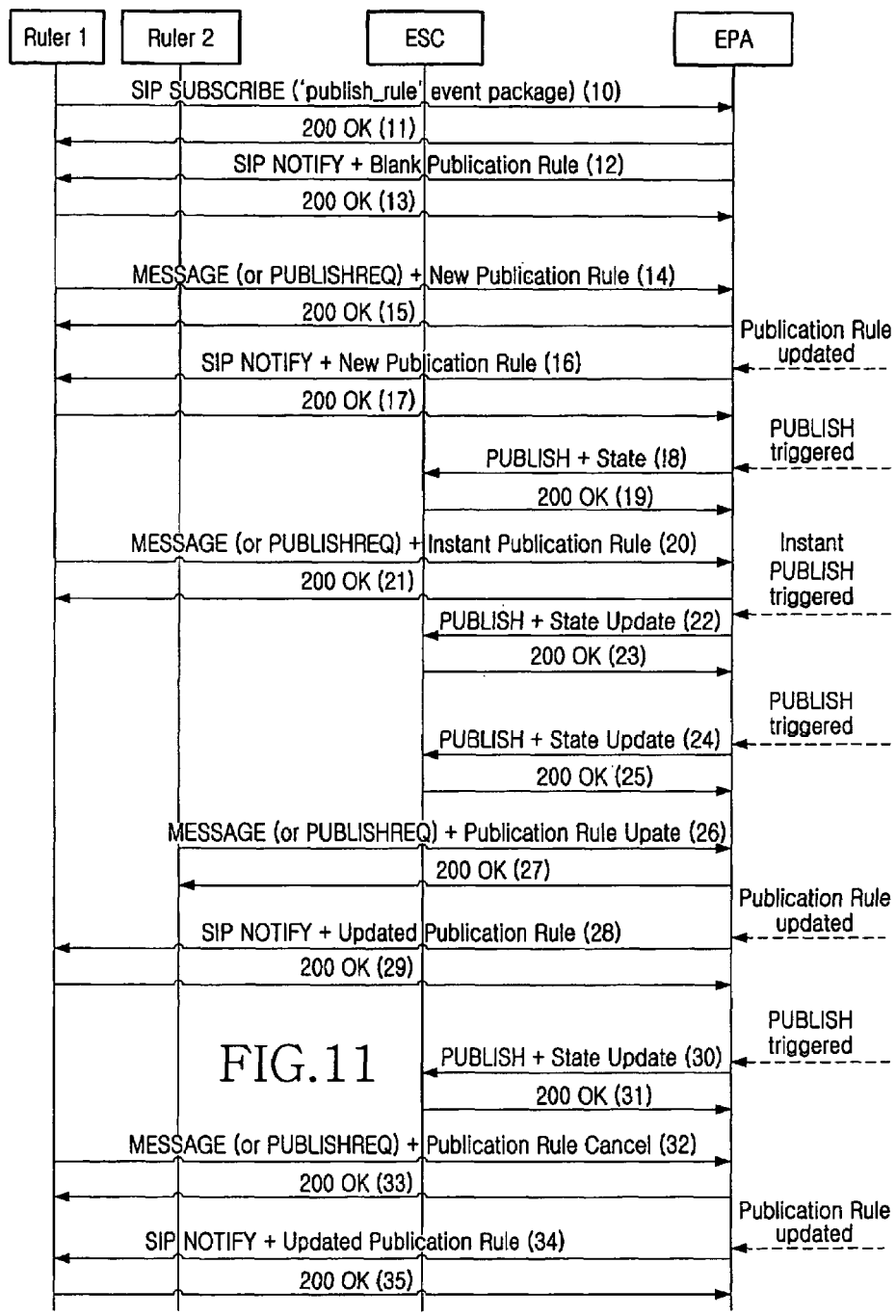
FIG. 11 is a signal flow diagram illustrating an EPA control mechanism in accordance with the present invention.

A Publication Rule implementation method of the present invention will be described with reference to FIGS. 11 and 12. Examples of a signal flow and message formats in an EPA control mechanism will be described with reference to FIGS. 11 and 13A to 13K. In FIG. 11, it is assumed that target state information is game information.

Referring to FIG. 12, Ruler 1 is a UA for requesting "sip:brian@example.com" and Ruler 2 is a UA for representing "sip:admin@example.com", i.e., a system administrator. An EPA publishes a game state of "sip:brian@example.com" to an ESC. A publication operation of the EPA is controlled by a Publication Rule of Ruler 1 and Ruler 2.

In steps 10 to 13, Ruler 1 requests synchronization for a Publication Rule of the EPA and the EPA sends a response message to the request, using a "publish_rule" event package as described with reference to method (4). At this time, the Publication Rule is currently in a blank state. The formats of messages sent in steps 10 to 13 correspond to formats (a) to (d) shown in FIGS. 13A and 13B.

In steps 14 and 15, Ruler 1 transfers the Publication Rule to the EPA and the EPA processes the Publication Rule and sends a response, using Methods (1), (2), and (3). For example, Ruler 1 can request that the EPA should publish a game state of "sip:brian@example.com" in every 100 sec in step 14. The formats of messages sent in steps 14 and 15 correspond to formats (e) and (f) shown in FIGS. 13B and 13C.

In steps 16 and 17, the Publication Rule updated through the above-described process is synchronized to Ruler 1. That is, in step 16, the EPA sends notification of the updated Publication Rule to Ruler 1 and Ruler 1 sends a response message corresponding to a 200 OK message to the EPA in response to the received notification. The formats of messages sent in steps 16 and 17 correspond to formats (g) and (h) shown in FIGS. 13C and 13D.

In steps 18 and 19, the EPA publishes a game state of "sip:brian@example.com" to the ESC based on of RFC 3903. The formats of messages sent in steps 18 and 19 correspond formats (i) and (j) shown in FIG. 13D.

In steps 20 to 23, Ruler 1 requests that the EPA should instantly publish a game state of "sip:brian@example.com" and the EPA publishes the associated state to the ESC immediately, using methods (1) and (2). As described with reference to methods (1) and (3), the instant Publication Rule is published once and its effect is lost after publishing, such that an existing Publication Rule can be applied. Since the instant Publication Rule does not vary the existing Publication Rule as described with reference to Method (4), its synchronization is not required. The formats of messages sent in steps 20 to 23 correspond to formats (k) to (n) shown in FIGS. 13E and 13F.

In steps 24 and 25, publication is made to ESC in every 100 sec, per the existing Publication Rule. The formats of messages sent in steps 24 and 25 correspond to formats (o) and (p) shown in FIG. 13F.

In steps 26 and 27, a system administrator represented by "sip:admin@example.com" requests that the EPA should increase a publication interval to 500 seconds. That is, in step 26, Ruler 2 requests that the EPA should increase the publication interval to 500 seconds. When receiving the request, the EPA verifies authorization of a requestor and performs composition and then sends a response of a 200 OK message in step 27. Because the system administrator is authorized to request the Publication Rule, a request by the system administrator can be accepted in an authorization process as described with reference to method (3). The formats of messages sent in steps 26 and 27 correspond to formats (q) and (r) shown in FIG. 13G.

In steps 28 and 29, the Publication Rule updated by the system administrator is synchronized to Ruler 1. The formats of messages sent in steps 28 and 29 correspond to formats (s) and (t) shown in FIG. 13H.

In steps 30 and 31, the EPA publishes a game state of "sip:brian@example.com" to the ESC according to the updated Publication Rule based on the method defined in RFC 3903. The formats of messages sent in steps 30 and 31 correspond to formats (u) and (v) shown in FIG. 13I.

In steps 32 and 33, Ruler 1 sends a request for canceling all existing Publication Rules according to Methods (1) and (2). The publication cancel request is made to initialize a Publication Rule. The formats of messages sent in steps 32 and 33 correspond to formats (w) and (x) shown in FIGS. 13J and 13K.

In steps 34 and 35, the result of the cancelled Publication Rule is synchronized to Ruler 1. The formats of messages sent in steps 34 and 35 correspond formats to (y) and (z) shown in FIG. 13K.

The present invention provides an explicit method for controlling an EPA through external objects including an ESC, thereby controlling the publication operation of the EPA. The present invention can make solicitation for a particular state by activating and deactivating the EPA on-demand. When the method of the present invention is used, a system can control a state publication operation, which is different from the conventional system. Therefore, the present invention can reduce system traffic load and can improve user experience.

Although the preferred embodiments of the present invention have been disclosed for illustrative purposes, those skilled in the art will appreciate that various modifications, additions, and substitutions are possible, without departing from the scope of the present invention. Therefore, other possible embodiments and modifications without departing from the principle of the present invention may fall into the protected scope of the present invention.

What is claimed is:

1. A system for providing a presence service, the system comprising:
   a Ruler for describing a requested publication operation of an Event Publication Agent (EPA) for target presence state information using a Publication Rule, sending the Publication Rule to the EPA responsible for publication of the target presence state information, updating or canceling the Publication Rule according to need, and sending a Publication Rule synchronization request to the EPA using an event package;
   the EPA for registering its publication capability on a set of presence state information to Session Initiation Protocol (SIP) Registrar using a Media Feature Tag, receiving and composing Publication Rules for the presence state information from the Ruler, performing publication to an Event State Compositor (ESC) for the presence state information according to the composed Publication Rules, modifying the Publication Rule upon its update or cancel request from the Ruler, changing publication behavior to the ESC for the presence state information according to the modified Publication Rule, sending as a response message a most up-to-date Publication Rule to a Ruler who has requested the Publication Rule synchronization request using the event package, and notifying the Publication Rule synchronization requesting Ruler of further updates of the Publication Rule; and
   an SIP Registrar for registering the EPA with its publication capability on a set of presence information using the Media Feature Tag as requested by the EPA, deciding the routing of a Publication Rule for target presence state information to the EPA responsible for publication of the target presence state information according to Media Feature Tag information as registered by the EPA.

2. A method for providing a presence service, the method comprising:
   registering an Event Publication Agent (EPA) with a publication capability on a set of presence state information using a Media Feature Tag according to a Session Initiation Protocol (SIP);
   sending a Publication Rule for target presence state information from a Ruler to the EPA;
   routing the Publication Rule for the target presence state information to the EPA responsible for publication of the target presence state information according to Media Feature Tag information as registered by the EPA;
   receiving the Publication Rule from the EPA;
   performing publication from the EPA to an Event State Compositor (ESC) for the target presence state information according to the Publication Rule;
   requesting, by the Ruler, to update or cancel the Publication Rule;
   receiving, by the EPA, the request from the Ruler to update or cancel the Publication Rule and modifying the Publication Rule accordingly;
   performing publication from the EPA to the ESC according to the modified Publication Rule;
   sending a Publication Rule synchronization request from the Ruler to the EPA using an event package;
   sending, by the EPA, as a response message to the Publication Rule synchronization request from the Ruler a most up-to-date Publication Rule to the requesting Ruler; and
   sending notification of further updates of the Publication Rule from the EPA to the Publication Rule synchronization requesting Ruler.

* * * * *